March 20, 1934.  D. J. MARTIN ET AL  1,951,987
TWO-CYCLE INTERNAL COMBUSTION ENGINE
Filed Feb. 26, 1931  3 Sheets-Sheet 1
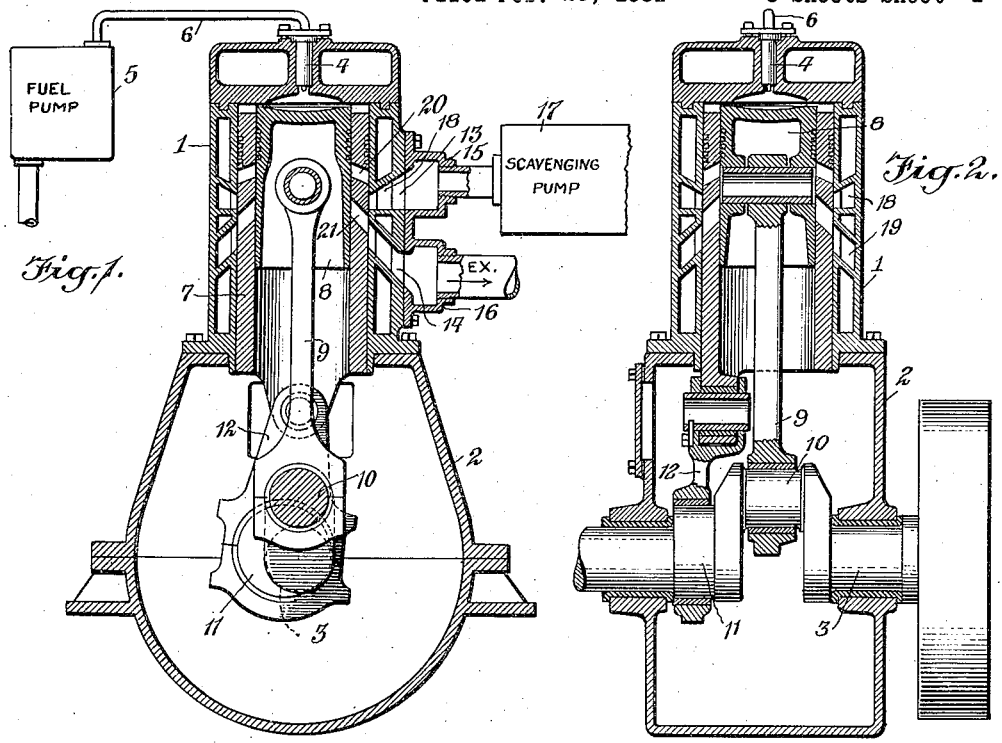
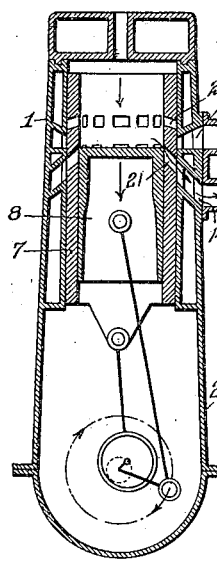
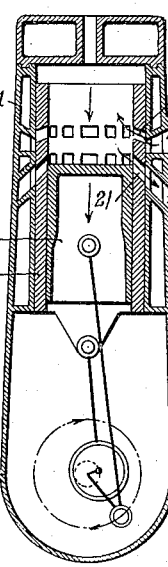
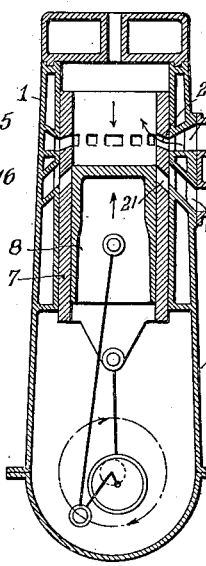
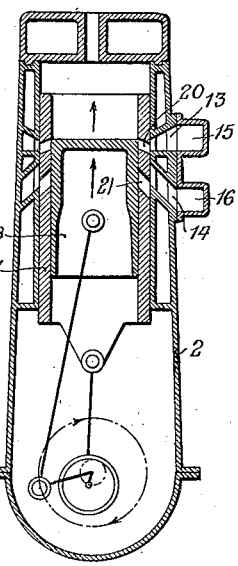
WITNESSES
INVENTORS
Douglas J. Martin
Kosta P. Rado
BY
ATTORNEYS March 20, 1934. D. J. MARTIN ET AL 1,951,987
TWO-CYCLE INTERNAL COMBUSTION ENGINE
Filed Feb. 26, 1931 3 Sheets-Sheet 2
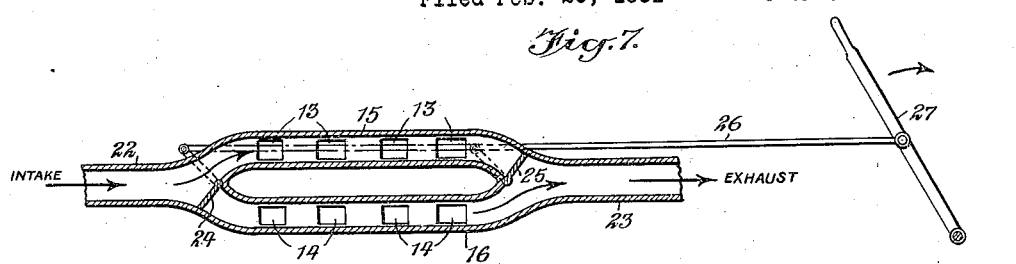
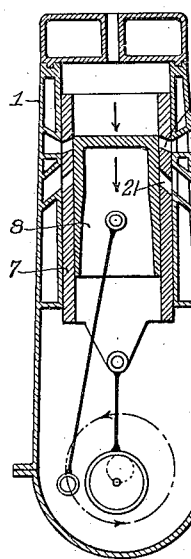 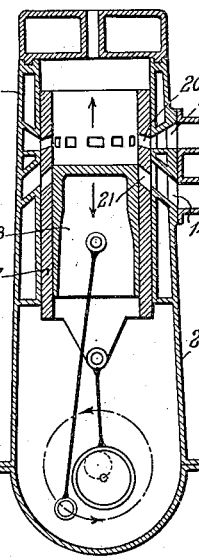 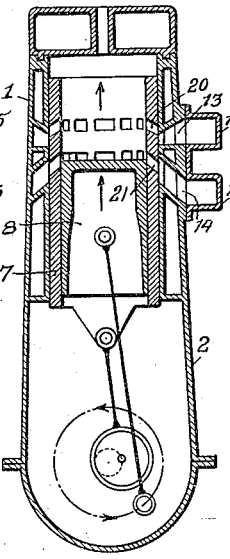 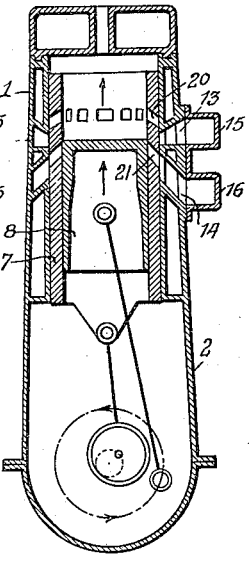
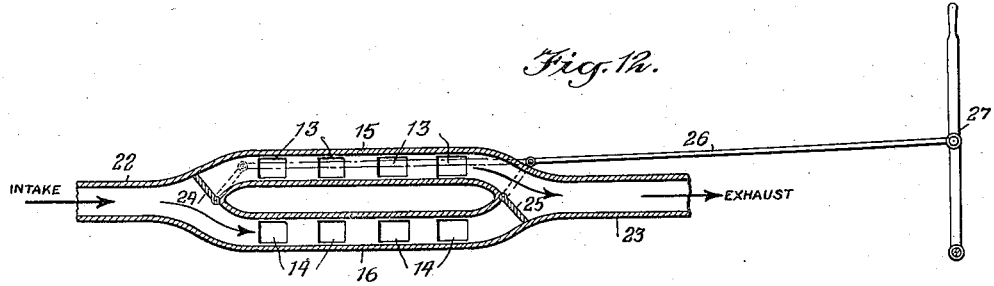
WITNESSES
INVENTORS
Douglas J. Martin
Kosta P. Rado
BY
ATTORNEYS Patented Mar. 20, 1934

1,951,987

UNITED STATES PATENT OFFICE 1,951,987

TWO-CYCLE INTERNAL COMBUSTION ENGINE

Douglas J. Martin and Kosta P. Rado, New York, N. Y., assignors to Martin Motors, Inc., New York, N. Y., a corporation of Delaware Application February 26, 1931, Serial No. 518,544

29 Claims. (Cl. 123—41)

This invention relates to two-stroke cycle internal combustion engines, and more specifically to two-stroke cycle engines of the Diesel or semi-Diesel type. It is also applicable to gas, gasoline, or other vapor or liquid fuel engines.

An object of the invention is to provide an engine employing a concentric compression sleeve surrounding the working piston and having reciprocating movement in the cylinder, which sleeve is provided with scavenging air inlet ports and exhaust ports co-operating with scavenging inlet ports and exhaust ports in the cylinder, and said sleeve, in conjunction with the working piston, properly times the opening and closing of the respective ports to insure thorough exhaust, scavenging and supercharging of the combustion space to the desired degree.

In securing the best results, both where the scavenging ports are circumferentially placed around the lower part of the cylinder and sleeve, and the exhaust ports are similarly circumferentially placed about the lower portion of the cylinder and sleeve, below the ring of scavenging ports, and also where the exhaust ports are placed around a semi-circumference and the scavenging ports around the opposite semi-circumference, it is essential, especially in the case of the total circumferential placement of ports, that the sleeve have a sufficient thickness, from inside surface to outside surface, to permit the ports in the sleeve to register, in the most efficient way with the ports in the cylinder, by means of the inclination made possible because of this thickness, with respect to the longitudinal axis of the sleeve. This essential thickness of sleeve also permits us to direct the stream of exhaust gases and the following stream of scavenging air, and supercharging air, to any desired angle, down for the exhaust and up for the scavenging and supercharging air, and to any desired angles, with reference to the radii, through the direction made possible because of the thickness of the sleeve between inner and outer surfaces.

It is also essential, in the case of the circumferential ports, that this thickness be employed to so space the rows of exhaust and scavenging ports in the cylinder that the manifold connections will always be separated from each other. The thickness of sleeve enables this form of porting to function and is an important part of our invention. It also provides a type of movable direction nozzle within the cylinder both for the exhaust gases and the scavenging and supercharging air.

A further object of this invention is to provide an engine that is readily reversible. The manifolds connected to the respective ports in the cylinder are provided with valves or other suitable means whereby the flow of exhaust gases and of scavenging and supercharging air can be transposed, the exhaust gases passing out through what were the scavenging ports, and the scavenging air coming in through what were the exhaust ports, thereby allowing the engine to run in reverse motion, with reasonable efficiency.

In carrying out our invention the movement of the sleeve is short as compared with the movement of the working piston, and the eccentric, or other device on the crank shaft, controlling the movement of the sleeve, gives an appreciable lag to the sleeve. We have found that a lag of fifty degrees, more or less, permits of the most effective porting. We, of course, do not wish to be limited to the exact degree of lag, nor to the relative stroke and areas of sleeve and piston.

Our improved engine has many features of advantage, some of which may be enumerated as follows:

In the normal running of the engine the exhaust ports open first, although below the scavenging port openings. This is due to the fact that the outer surface of the sleeve has not yet uncovered the scavenging ports in the cylinder. After the exhaust ports are open wide, the sleeve, riding down, uncovers the scavenging ports in the cylinder. Scavenging is directed upward, and at any desired angle, with reference to the radii, then the downward motion of the sleeve, and the upward motion of the working piston, closes the exhaust ports, while the scavenging ports remain wide open to any desired point where they are closed by the piston on its compression stroke.

Perfect port valving is had for supercharging to any desired amount without the use of auxiliary valves, ports, etc.

High volumetric efficiency results, due to the large port areas and to characteristics of combined harmonic motions of the working piston and sleeve and their relation to the stationary ports in the lower part of the cylinder.

Efficient turbulence is accomplished within the cylinder, a sharp and accurately defined cut-off of the ports is had under all conditions, and highest efficiency with minimum fuel consumption is secured.

The sleeve not only functions in combination with the piston to control the ports, but also aids to maintain or boost compression while the piston is passing top dead center, as disclosed originally in United States Patent No. 1,280,058, granted on September 24, 1918, to Douglas J. Martin.

With these and other objects in view, the invention consists in certain novel features of construction and combinations and arrangements of parts, all of which will be more fully hereinafter described and pointed out in the claims.

In the accompanying drawings—

Figure 1 is a view in longitudinal section illustrating our improved engine;

Figure 2 is a view in longitudinal section at right angles to Figure 1;

Figures 3, 4, 5 and 6 are views in longitudinal section of the engine showing more or less diagrammatically the sleeve and piston in different porting positions;

Figure 7 is a view in longitudinal section through the manifold showing the arrangement of valves for controlling the flow of scavenging air and exhaust gases when the engine is running normally or in a forward direction;

Figures 8, 9, 10 and 11 are views similar to Figures 3, 4, 5 and 6 illustrating more or less diagrammatically the porting positions of the sleeve and working piston when the engine is reversed;

Figure 12 is a view in longitudinal section of the manifold showing the paths of flow of the scavenging air and exhaust gases when the engine is reversed;

Figure 13:
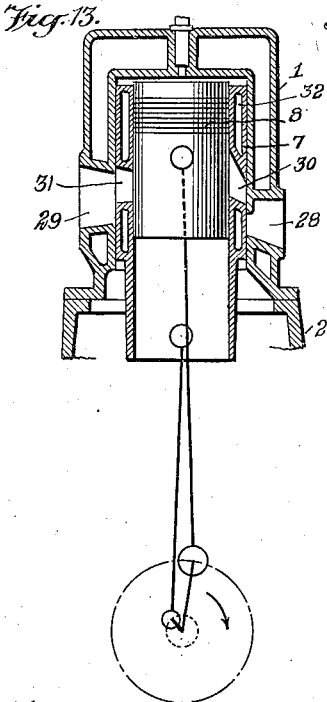
Figures 13, 14, 15, 16 and 17 are views in longitudinal section illustrating more or less diagrammatically the porting positions of the sleeve and valve in a slightly modified form of the invention.

In all of the different forms of the invention illustrated, we employ the reference character 1 to illustrate the cylinder of the engine, which is secured to a crank case 2 on which a crank shaft 3 is mounted. An injector nozzle 4 is provided in the head of the cylinder 1 and receives fuel from a fuel pump 5 through a pipe 6. A spark plug, not shown, may be added when the nature of the fuel or the compression pressures are such as to make compression ignition impracticable.

A compression sleeve 7 fits the bore of the cylinder 1 and reciprocates therein, and a working piston 8 fits the bore of the sleeve 7 and reciprocates therein.

A connecting rod 9 connects the working piston 8 with a crank arm 10 on the shaft 3, and an eccentric 11 on the shaft 3 transmits motion to a link 12 which is connected to the sleeve 7 for imparting motion to the latter.

It will be noted that the eccentric is so positioned with relation to the crank arm as to give a lag to the motion of the sleeve when operating in the normal ahead direction of rotation.

The cylinder 1 is provided in its lower portion with a series of air scavenging inlet ports 13 and a series of exhaust ports 14 below the same. Manifolds 15 and 16 communicate with the ports 13 and 14 respectively, and we illustrate diagrammatically a scavenging pump 17 communicating with the manifold 15.

The cylinder 1 is made with internal annular manifold passages 18 and 19 communicating respectively with the ports, and are made so that a circular series of ports 20 and 21 in the sleeve 7 may communicate with these manifolds 18 and 19 and permit or allow a free radial passage of air and gases around the cylinder. The working piston 8 operates to cut-off the ports 20 and 21 in the sleeve 7, and said sleeve operates to cut off the manifold 18 constituting portions of the ports 13 and 14.

For convenience of description, we will assume that the manifold 18 is a portion of the port 13 and the manifold 19 is a portion of the port 14 or, in other words, that the ports 13 and 14 extend entirely through the wall of the cylinder and are opened and closed by the sleeve 7.

Particular attention is called to the fact that the ports 20 and 21 in the sleeve 7 have an angle or taper; that is to say, the walls of these ports may be positioned at an angle to both the longitudinal and transverse axes of the sleeve, and the sleeve should have a sufficient thickness to permit of the desired inclination or angularity of the ports for proper porting.

In this preferred arrangement of ports the circular series of inlet ports, 13, and that of exhaust ports, 14, in the cylinder walls, and the corresponding ports 20 and 21 of the sleeve are uniformly distributed around the entire circumference of both cylinder and sleeve, thereby providing large port areas equally distributed all around the piston, and so assuring equalization of temperatures in cylinder walls, sleeve and piston combined with the freest passage of outgoing exhaust gases and incoming scavenging air.

Reference is made particularly to Figures 3, 4, 5 and 6 of the drawings which illustrate various porting positions of the sleeve 7 and working piston 8, and arrows are employed in the several figures to illustrate the direction of movement of both the sleeve and the working piston, and also to show the direction of flow of the scavenging air and exhaust gases.

Figure 3 illustrates the position of the ports on the power or working stroke of the piston, showing the piston moving downwardly and uncovering the exhaust ports 21 in the sleeve 7, the latter having moved to a position to open or uncover the exhaust ports 14 communicating with the manifold 16. The exhaust gases rush out through the ports and manifold and it will be noted that the scavenging air inlet ports 13 are closed at this time and are not opened until the working piston and sleeve move downwardly to the position shown in Figure 4. At this time the scavenging air flows through the inlet ports 13 and through the ports 20 and sleeve 7 and completely forces out the burnt gases, thus scavenging the engine.

On the upward movement of the working piston the exhaust ports are first closed, as shown in Figure 5 of the drawings, the inlet air scavenging ports remaining open, so that after the exhaust is closed the desired supercharge may be had.

As the working piston continues to move upwardly the inlet scavenging ports are closed, as shown in Figure 6 of the drawings, and then the piston and sleeve move upwardly to compress the charge.

As the working piston moves past top dead center, thus causing it to move downwardly, the sleeve continues to move upwardly to maintain or boost compression, as is the case in the Martin type of motor under consideration.

It will be noted that in porting both the sleeve and the piston co-operate, and while the working piston operates to uncover the ports in the sleeve the sleeve operates to uncover the ports in the cylinder and there is proper synchronization of the movements of sleeve and piston to give the desired sequence and maximum efficiency in porting.

In reversing direction of rotation of the engine, the scavenging air is caused to enter the manifold 16 and the burnt gases are allowed to exhaust through the manifold 15. A simple means for bringing about this reversal of the engine is illustrated in Figure 7 of the drawings, in which it will be seen that the manifolds 15 and 16 communicate at their respective ends with pipes 22 and 23 respectively, and valves or pivoted gates 24 and 25 are employed which control and regulate the paths of flow. These valves or gates 24 and 25 may be operatively connected to a rod 26, which in turn is operatively connected to the starting valves and the fuel pump or other starting and fuel injection mechanism of the motor, and we illustrate diagrammatically a lever 27 which may be considered as a controlling or connecting means for this purpose, said lever being operatively connected to the rod 26.

The pipe 22 constitutes an intake for scavenging air and the pipe 23 an exhaust outlet, and the air may be directed either to the ports 13 or 14 in accordance with the positions of the valves 24 and 25; thus, when air is directed to the ports 13 the engine will be operating in its normal forward direction, and when air is directed to the ports 14 the engine will be reversed and the ports 13 will constitute exhaust ports. The normal position of the valves in the ordinary forward running of the engine is illustrated in Figure 7 of the drawings, and in Figure 12 of the drawings the valves are shown in the position for reversing the engine.

Figures 8, 9, 10 and 11 of the drawings illustrate the porting positions of the sleeve and piston when the engine is reversed, and will now be described in detail.

In Figure 8 the working piston and sleeve have moved downwardly on the working or power stroke, and the ports 13 and 20 in the cylinder and sleeve, respectively (now being exhaust ports) are in communication, and the working piston is opening the ports 20 to allow the burnt gases to escape, the scavenging air being cut off.

In Figure 9 the working piston is still moving downwardly and is beginning to open or uncover the ports 21 in the sleeve 7 which are in communication with the ports 14 of the cylinder, and (as these ports are now air intake scavenging ports) the scavenging air is beginning to rush into the cylinder to force out the burnt gases and completely scavenge the engine.

Figure 10 shows the working piston beginning its upstroke with all of the ports open the ports 13 being closed by the upward movement of the sleeve 7 while the lower port 21 is still in open communication with the ports 14, so that during a portion of the upward stroke of the working piston supercharging air is admitted after the exhaust is closed, for supercharging.

Figure 11 illustrates a further upward movement of both sleeve and piston, cutting off all ports so that the piston during the rest of its upward movement compresses the charge.

As above stated, Figure 7 illustrates the position of the valves 24 and 25 in the manifolds for controlling the flow of air and burnt gases in the normal forward operation of the engine, and Figure 12 illustrates the position of the valves when the engine is reversed. In both of these figures a series of inlet and exhaust ports are shown to indicate that the manifold may control any desired number of cylinders, although in the drawings only a single cylinder is illustrated.

In the modified form or our invention illustrated in Figures 13, 14, 15, 16 and 17 of the drawings, burnt gases are exhausted through one side of the cylinder and the scavenging air is admitted through the other side of the cylinder. In this form of the invention we use the same reference numerals employed in connection with the other form of the invention to indicate like parts, but different reference characters to indicate the modified forms of ports. For example, we employ reference numeral 1 to indicate the cylinder, reference character 7 to indicate the sleeve, and reference character 8 to indicate the working piston.

The cylinder 1 has scavenging air inlet ports 28 in one side and exhaust ports 29 in the opposite side. The sleeve 7 is provided on one side with a series of inlet ports 30 adapted to communicate with the inlet ports 28, and said sleeve is provided in its side opposite to the side having the ports 30 with a series of exhaust ports 31 adapted to communicate with the exhaust ports 29 of the cylinder. It will be noted that the inlet or scavenging ports 30 are longer at their inner ends than at their outer ends, and that the inner ends extend to a plane above the upper ends of the exhaust ports 31. The outer ends of the ports 30 are appreciably narrower or shorter than the inner portions of said ports due to the inclination or angularity of the walls of said ports, and this tapering of the ports permits a proper timing of the opening and closing of said ports, as will more fully appear hereinafter.

In this modified form of our invention we show the sleeve 7 as jacketed or, in other words, having chambers 32 therein for the circulation of a cooling medium, and communication between the same and the jacketed cylinders can be had through the medium of the well-known telescopic joint.

This form of sleeve providing for fluid or other cooling medium is, of course, applicable to the previous porting shown, namely, the double row of circumferential ports.

The portage of the modified form of engine, shown in Figures 13 to 17 inclusive, is as follows:

Figure 13 shows the working piston moving downwardly on its power or working stroke with all ports closed.

Figure 14:
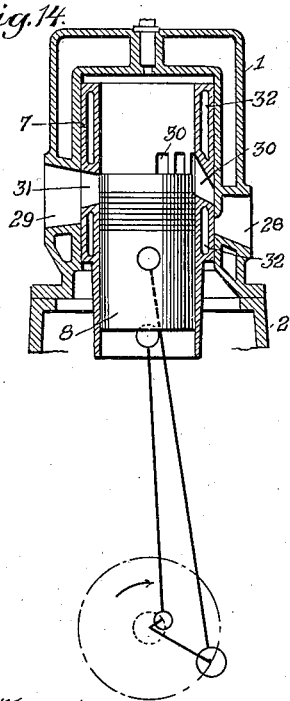

Figure 14 shows the working piston about to uncover the exhaust ports 31 of the sleeve 7, said ports 31 being in open communication with the exhaust ports 29 of the cylinder 1. The scavenging air intake ports are still closed by the sleeve 7.

Figure 15:
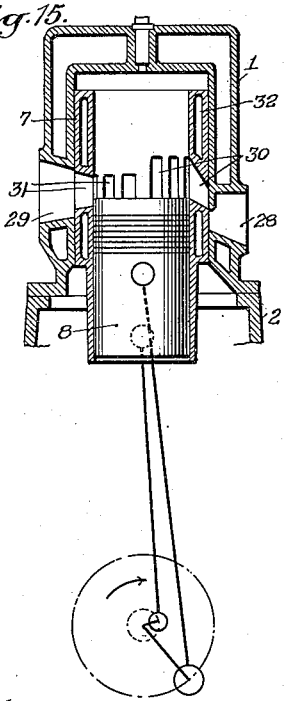

Figure 15 shows the working piston and sleeve having moved further downward on the power stroke with the exhaust ports completely open and the air intake ports about to open; that is, the sleeve 7 is just uncovering the ports 28, bringing the ports 30 into communication therewith to allow the air to rush into the cylinder and completely blow out burnt gases and thereby cleanly scavenge the engine.

Figure 16:
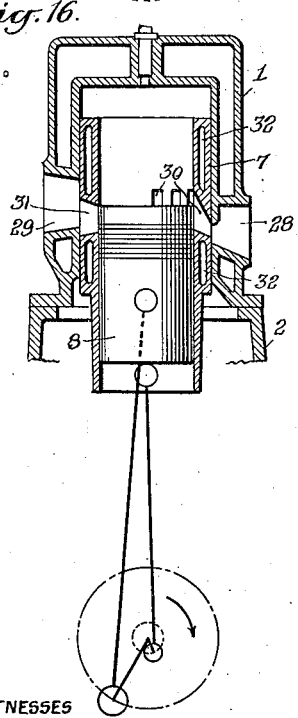

Figure 16 shows the working piston and sleeve as they are starting their upward movement, in which position it will be noted that the exhaust ports are closed by the working piston but the air intake scavenging ports remain open allowing air to be forced through them to give to the engine the desired supercharge.

Figure 17:
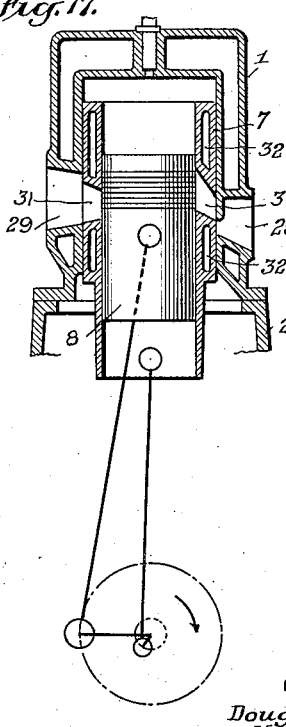

Figure 17 shows the further upward movement of the working piston and sleeve with the ports closed and the working piston compressing the charge.

Figure 18:
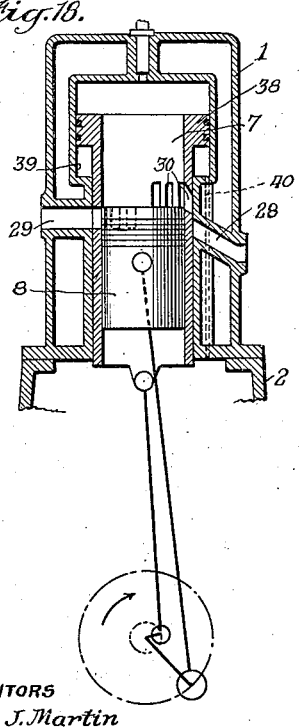
Figure 18 is a view in longitudinal section more or less diagrammatically illustrating another modification.

In the modified form shown in Figure 18 the compression sleeve 7 is shown as having a head or enlarged portion 38 at its upper end, moving in an enlarged bore 39 of the cylinder. In this form of the invention the main or skirt portion of the sleeve is relatively thin, or, in other words, externally of a reduced diameter as compared with the enlarged upper end 38. As the ports in this form of the invention operate in the same manner as the ports in the modification shown in Figures 13 to 17, like reference characters are employed to indicate the ports and passages of the engine shown in Figure 18 as those employed in Figures 13 to 17 inclusive. This modification is included to show that the invention is plausible with a thin-walled skirt and enlarged-headed sleeve. In this case it is necessary to provide for the entrance and escape of air below the enlarged head 38 of the sleeve. With this idea in view, we have shown more or less diagrammatically a duct or passage 40 connecting the lower portion of the larger bore of the cylinder with the crank case.

In all forms of the invention illustrated and described, it will be observed that by the combined action of the reciprocating compression sleeve and the reciprocating working piston, the exhaust ports always open first, allowing the pressure in the cylinder to fall as the burnt gases rapidly escape and shortly thereafter the air scavenging ports open and air rushes into the cylinder completely scavenging the engine.

The exhaust ports close first on the upward or compression stroke of the piston, but the scavenging air intake ports remain open for a sufficient length of time to admit air for supercharging, and this air is then trapped and the working piston completes its compression stroke and as, or shortly after, the piston passes top dead center the fuel charge is injected into the compressed air and, by the heat of compression, an electric spark or other means, the charge is ignited and the piston is forced downward on its power or working stroke. During the movement of the working piston passing top dead center the compression sleeve moves upwardly, thus maintaining or boosting compression.

It is our contention that with our improved form of porting, utilizing the compression sleeve and the working piston, a high efficiency and economy in fuel is had, its portage is perfectly timed, and distinctly improved results are accomplished over any engine of this type heretofore known.

While we have illustrated what we believe to be a preferred embodiment of our invention it is obvious that slight changes may be made in the general form and construction of the parts described without departing from our invention; and hence we do not limit ourselves to the specific details set forth but consider ourselves at liberty to make such changes and alterations as fairly fall within the spirit and scope of the claims.

What we claim is:

1. In a two stroke cycle internal combustion engine, the combination with a cylinder having scavenging air inlet and exhaust ports in its lower portion, a sleeve movable in the cylinder and having inlet and exhaust ports therein the exhaust port being located below the inlet port, and a working piston in the sleeve, said sleeve and piston controlling the opening and closing of said ports.

2. In a two stroke cycle internal combustion engine, the combination with a cylinder having scavenging air inlet and exhaust ports in its lower portion, a sleeve movable in the cylinder and having inlet and exhaust ports therein the exhaust port being located below the inlet port, and a working piston in the sleeve, said sleeve and piston controlling the opening and closing of said ports, the movements being such that the exhaust ports open first and the scavenging air intake ports open last.

3. In a two stroke cycle internal combustion engine, the combination with a cylinder having scavenging air inlet and exhaust ports in its lower portion, a sleeve movable in the cylinder and having inlet and exhaust ports therein the exhaust port being located below the inlet port, and a working piston in the sleeve, said sleeve and piston controlling the opening and closing of said ports, the movements being such that the exhaust ports open first and the scavenging air intake ports open last and remain open for a time for supercharging after the exhaust ports are closed.

4. In a two stroke cycle internal combustion engine, the combination with a cylinder having scavenging air inlet and exhaust ports in its lower portion, a sleeve movable in the cylinder and having inlet and exhaust ports therein the exhaust port being located below the inlet port, a working piston in the sleeve, said sleeve and piston controlling the opening and closing of said ports, and means operatively connected to the intake and exhaust ports and adapted to change paths of flow of air and burnt gases to provide for utilizing the same ports for reverse rotation of the engine.

5. In a two stroke cycle internal combustion engine, the combination with a cylinder having scavenging air inlet and exhaust ports in its lower portion, a sleeve movable in the cylinder and having inlet and exhaust ports therein the exhaust port being located below the inlet port, a working piston in the sleeve, said sleeve and piston controlling the opening and closing of said ports, the movements being such that the exhaust ports open first and the scavenging air intake ports open last, and means operatively connected to the intake and exhaust ports and adapted to change the direction of the flow of air and burnt gases on reverse of the engine.

6. In a two stroke cycle internal combustion engine, the combination with a cylinder having scavenging air inlet and exhaust ports in its lower portion, a sleeve movable in the cylinder and having inlet and exhaust ports therein the exhaust port being located below the inlet port, a working piston in the sleeve, said sleeve and piston controlling the opening and closing of said ports, the movements being such that the exhaust ports open first and the scavenging air intake ports open last and remain open for a time of supercharging after the exhaust ports are closed, and means operatively connected to the intake and exhaust ports and adapted to change the paths of flow of air and burnt gases so that by transposing the inlet and exhaust ports the same cycle of opening and closing the ports is retained when the engine operates in the reverse direction of rotation.

7. In a two stroke cycle internal combustion engine, the combination with a cylinder having scavenging air inlet and exhaust ports in its lower portion the exhaust port being located below the inlet port, a sleeve of appreciable thickness between inner and outer surfaces movable in the cylinder and having inlet and exhaust ports therein, and a working piston in the sleeve, said sleeve and piston controlling the opening and closing of said ports, the said intake ports in the sleeve tapering or inclined downwardly from the inner to the outer face of the sleeve.

8. In a two stroke cycle internal combustion engine, the combination with a cylinder having scavenging air inlet and exhaust ports in its lower portion the exhaust port being located below the inlet port, a sleeve movable in the cylinder and having inlet and exhaust ports therein, and a working piston in the sleeve, said sleeve and piston controlling the opening and closing of said ports, the movements being such that the exhaust ports open first and the scavenging air intake ports open last, and said intake ports in the sleeve tapering or inclined downwardly from the inner to the outer face of the sleeve.

9. In a two-stroke cycle internal combustion engine, the combination with a cylinder having scavenging air inlet and exhaust ports in its lower portion the exhaust port being located below the inlet port, a sleeve movable in the cylinder and having inlet and exhaust ports therein, and a working piston in the sleeve, said sleeve and piston controlling the opening and closing of said ports, the movements being such that the exhaust ports open first and the scavenging air intake ports open last and remain open for a time of supercharging after the exhaust ports are closed, and said intake ports in the sleeve tapering or inclined downwardly from the inner to the outer face of the sleeve.

10. In a two stroke cycle internal combustion engine, the combination with a cylinder having scavenging air inlet and exhaust ports in its lower portion, a sleeve movable in the cylinder and having inlet and exhaust ports therein, and a working piston in the sleeve, said sleeve and piston controlling the opening and closing of said ports, and said intake and exhaust ports in the sleeve tapered or inclined downwardly from the inner to the outer face of the sleeve.

11. In a two stroke cycle internal combustion engine, the combination with a cylinder having scavenging air inlet and exhaust ports in its lower portion, a sleeve movable in the cylinder and having inlet and exhaust ports therein, and a working piston in the sleeve, said sleeve and piston controlling the opening and closing of said ports, the movements being such that the exhaust ports open first and the scavenging air intake ports open last, and said intake and exhaust ports in the sleeve tapered or inclined downwardly from the inner to the outer face of the sleeve.

12. In a two stroke cycle internal combustion engine, the combination with a cylinder having scavenging air inlet and exhaust ports in its lower portion, a sleeve movable in the cylinder and having inlet and exhaust ports therein, and a working piston in the sleeve, said sleeve and piston controlling the opening and closing of said ports, the movements being such that the exhaust ports open first and the scavenging air intake ports open last and remain open for a time of supercharging after the exhaust ports are closed, and said intake and exhaust ports in the sleeve tapered or inclined downwardly from the inner to the outer face of the sleeve.

13. In a two stroke cycle internal combustion engine, the combination with a cylinder having scavenging air inlet and exhaust ports in its lower portion, a sleeve movable in the cylinder and having inlet and exhaust ports therein, and a working piston in the sleeve, said sleeve and piston controlling the opening and closing of said ports, said intake and exhaust ports in the sleeve tapered or inclined downwardly from the inner to the outer face of the sleeve, and the exhaust ports in the cylinder have a corresponding taper.

14. In a two stroke cycle internal combustion engine, the combination with a cylinder having scavenging air inlet and exhaust ports in its lower portion, a sleeve movable in the cylinder and having inlet and exhaust ports therein, and a working piston in the sleeve, said sleeve and piston controlling the opening and closing of said ports, the movements being such that the exhaust ports open first and the scavenging air intake ports open last, said intake and exhaust ports in the sleeve tapered or inclined downwardly from the inner to the outer face of the sleeve, and the exhaust ports in the cylinder have a corresponding taper.

15. In a two stroke cycle internal combustion engine, the combination with a cylinder having scavenging air inlet and exhaust ports in its lower portion, a sleeve movable in the cylinder and having inlet and exhaust ports therein, and a working piston in the sleeve, said sleeve and piston controlling the opening and closing of said ports, the movements being such that the exhaust ports open first and the scavenging air intake ports open last and remain open for a time of supercharging after the exhaust ports are closed, said intake and exhaust ports in the sleeve tapered or inclined downwardly from the inner to the outer face of the sleeve, and the exhaust ports in the cylinder have a corresponding taper.

16. In a two stroke cycle internal combustion engine, the combination with a cylinder having scavenging air inlet and exhaust ports in its lower portion the exhaust port being located below the inlet port, a sleeve movable in the cylinder and having inlet and exhaust ports therein, a working piston in the sleeve, said sleeve and piston controlling the opening and closing of said ports, manifolds communicating with the inlet and exhaust ports of the cylinder, said manifolds having common inlets and outlets, and valves for changing the path of flow through said manifolds, said valves operatively connected with the starting means of the engine.

17. In a two stroke cycle internal combustion engine, the combination with a cylinder having scavenging air inlet and exhaust ports in its lower portion, the exhaust port being located below the inlet port, a sleeve movable in the cylinder and having inlet and exhaust ports therein, a working piston in the sleeve, said sleeve and piston controlling the opening and closing of said ports, the movements being such that the exhaust ports open first and the scavenging air intake ports open last, manifolds communicating with the inlet and exhaust ports of the cylinder, said manifolds having common inlets and outlets, and valves for changing the path of flow through said manifolds, said valves operatively connected with the starting means of the engine.

18. In a two stroke cycle internal combustion engine, the combination with a cylinder having scavenging air inlet and exhaust ports in its lower portion, the exhaust port being located below the inlet port, a sleeve movable in the cylinder and having inlet and exhaust ports therein, a working piston in the sleeve, said sleeve and piston controlling the opening and closing of said ports, the movements being such that the exhaust ports open first and the scavenging air intake ports open last and remain open for a time of supercharging after the exhaust ports are closed, manifolds communicating with the inlet and exhaust ports of the cylinder, said manifolds having common inlets and outlets, and valves for reversing the flow through said manifolds, said valves operatively connected with the starting means of the engine.

19. In an internal combustion engine, the combination with a cylinder, a working piston in the cylinder, and a sleeve interposed between the cylinder and the piston with spaced ports therein co-operating with the cylinder and working piston to control the exhaust of gases and the intake of scavenging air, the exhaust port being located below the inlet port, and means positively timing the movements of the sleeve and working piston whereby the exhaust port opens first and closes first and the scavenging intake port opens during a portion of the time the exhaust port is opened, and remains open for a period after the exhaust port is closed.

20. In an internal combustion engine, the combination with a cylinder, a working piston in the cylinder, and a sleeve interposed between the cylinder and the piston with spaced ports therein co-operating with the cylinder and working piston to control the exhaust of gases and the intake of scavenging air, the exhaust port being located below the inlet port, and means positively timing the movements of the sleeve and working piston whereby the exhaust port opens first and closes first and the scavenging intake port opens during a portion of the time the exhaust port is opened and remains open for a period after the exhaust port is closed, both when the engine is operating in a forward direction or in a reverse, and during reverse the function of the ports is interchanged.

21. In an internal combustion engine, the combination with a cylinder, a working piston and a sleeve interposed between the cylinder and the piston, said sleeve having exhaust and intake ports therein, the exhaust port being located below the inlet port, said ports constituting nozzles for communicating with ports in the cylinder and controlling the path of flow as well as admission and exhaust, said sleeve ports constituting nozzles movable longitudinally in the cylinder.

22. A two-stroke cycle internal combustion engine of the type in which a sleeve provided with inlet and exhaust ports is movable in a cylinder also provided with inlet and exhaust ports, and in which a working piston reciprocal within the sleeve controls in co-operation with said sleeve the opening and closing of said inlet and exhaust ports, characterized in the provision of means whereby the connections of the inlet and outlet ports of the cylinder to the intake and exhaust outlet respectively can be transposed for reversing the engine.

23. A two-stroke cycle internal combustion engine according to claim 22, wherein in either direction of rotation of the engine the movements of the piston and sleeve are such that on the working stroke of the piston the exhaust ports open prior to the opening of the inlet ports and the latter remain open for a time after the exhaust ports are closed on the compression stroke.

24. A two-stroke cycle internal combustion engine according to claim 22, characterized in the provision of manifolds communicating with the inlet and exhaust ports of the cylinder, said manifolds having common inlets and outlets and valves for changing the path of flow therethrough, said valves being operatively connected to the starting means of the engine.

25. A two-stroke cycle internal combustion engine according to claim 22, wherein the inlet ports in the sleeve are tapered.

26. A two-stroke cycle internal combustion engine according to claim 22, wherein the inlet ports in the sleeve are inclined downwardly from the inner to the outer face of the sleeve.

27. In a two-stroke cycle internal combustion engine, the combination with a cylinder having a scavenging air inlet in its lower portion and an exhaust port in its lower portion on a plane below the inlet port, a sleeve movable in the cylinder and having inlet and exhaust ports therein, and a working piston in the sleeve, said sleeve and piston controlling the opening and closing of said ports.

28. In a two-stroke cycle internal combustion engine, the combination with a cylinder having a scavenging air inlet in its lower portion and an exhaust port in its lower portion on a plane below the inlet port, a sleeve movable in the cylinder and having inlet and exhaust ports therein, a working piston in the sleeve, said sleeve and piston controlling the opening and closing of said ports, a crank shaft, and members on the crank shaft located at an angle of approximately 50° to each other and connected respectively to the sleeve and working piston.

29. In a two-stroke cycle internal combustion engine the combination with a cylinder having a circular series of scavenging air inlets in its lower portion, and a circular series of exhaust ports in its lower portion below the inlet ports, a sleeve movable in the cylinder and having a circular series of inlet and exhaust ports therein, a working piston on the sleeve, said sleeve and piston controlling the opening and closing of said circular series of ports.

DOUGLAS J. MARTIN.
KOSTA P. RADO.